Figure 1:
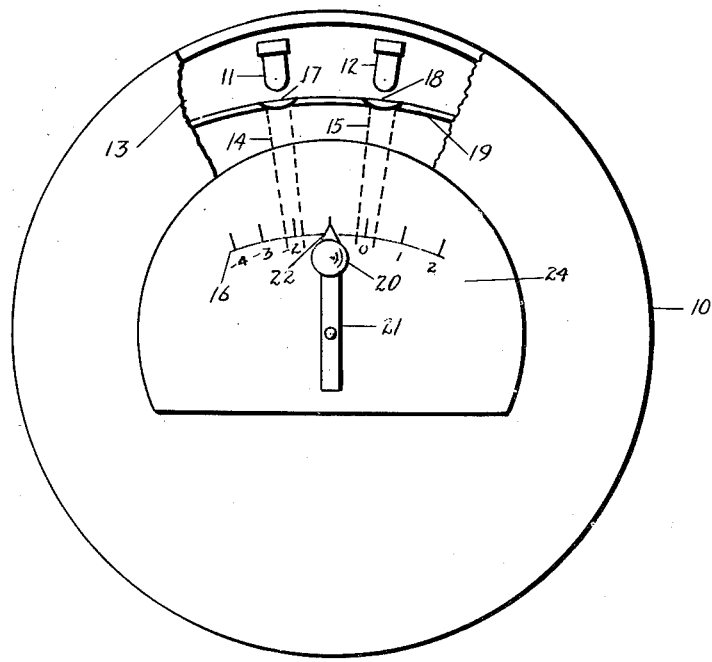

March 18, 1952     H. KENOSIAN     2,589,263
METER
Filed Oct. 9, 1946

HARRY KENOSIAN
INVENTOR

By William D. Hall.
ATTORNEY

Patented Mar. 18, 1952

2,589,263

UNITED STATES PATENT OFFICE 2,589,263

METER

Harry Kenosian, Chelsea, Mass.

Application October 9, 1946, Serial No. 702,107

4 Claims. (Cl. 116—129)

(Granted under the act of March 3, 1883, as amended April 30, 1928; 370 O. G. 757)

The invention described herein may be manufactured and used by or for the Government for governmental purposes, without the payment of any royalty thereon.

This invention is in electrical apparatus and more particularly is in high speed meters.

The need for an accurate and uniform means for reading the indications given by a high speed meter is well known to those skilled in the arts. Further, when meters of this type are used for long periods of time, the almost constant watching that is necessary becomes tiring.

One object of this invention is to provide a means for an accurate and uniform reading of the indications given by a high speed meter.

A further object of this invention is to provide a means whereby the indications given by a high speed meter may be read at many angles not in a direct sight line with the dial.

Other objects of this invention will be apparent from a reading of the following specification and claims.

Figure 2:
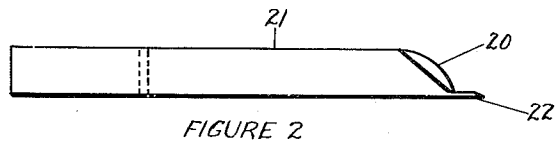

In the drawings:

Figure 1 is a front view of my invention, the cover thereof being partly broken away; and Figure 2 is a detail of the pointer used in my invention.

Referring to the drawings and particularly to Figure 1, 10 is the front cover of a high speed meter of the type commonly used to monitor a rapidly changing volume level. Lamps 11 and 12 are mounted in a convenient fashion in the case, a portion of which is shown at 13, so that their beams of light 14 and 15, respectively, may be directed in paths adjacent the scale 16 of dial 24. The locations of lamps 11 and 12 with respect to the numerals on the scale 16 are dependent on those points referred to most frequently in controlling volume level.

Lenses 17 and 18 are mounted on an opaque cross member 19 and are positioned so that beams 14 and 15 are concentrated on the two predetermined points adjacent scale 16. The width of concentration is somewhat less than the width of a mirror surface 20 of pointer 21. Lenses 17 and 18 are of different colors so that the levels represented by beams 14 and 15 may be easily distinguished. Since the colors red and green do not mix easily, they are used in the preferred mode of my invention.

It is perhaps apparent, but should be noted here, that, although colored lenses are described as the preferred means for producing colored light and at the same time concentrating it on the dial, they are not necessary. Any one of several means for producing colored light in combination with an aperture or the like for concentrating the beams may be used.

A pointer 21 is provided for the meter, and the pointer has on its indicating end a mirror surface 20 of the convex type (as can be seen in Figure 2), which reflects at many angles not in a direct sight line with the meter. In addition, the pointer is provided with a tip 22 which can be used when the meter is used for measurements.

The angular position of mirror surface 20 is such that the reflected beams will not be obscured by the meter case. In addition, the mirror surface 20 is facing outwardly with respect to dial 24 so that the reflected beam may be seen.

Assume that the above described meter is located on a control desk of a radio studio and that a program is in progress, the volume level of which is fluctuating at some point below −2 decibels. With a green lens adjacent the −2 decibel point on scale 16 and a red lens adjacent the 0 decibel point, any movements of pointer 21 past these points are easily detected by an operator even though he is not in a direct sight line with the meter face.

If, for example, the level of the program moves to −2 decibels, a green beam of light is visible. A red beam of light is visible if the surge increases to the 0 decibel point. Since in most cases the volume level is kept well below the 0 decibel point, the operator makes the necessary volume control adjustment. If a green beam of light is seen, the volume is known to be down to −2 decibels.

The foregoing description is in specific terms, and many modifications and uses will suggest themselves. For a true scope of the invention, reference should be had to the appended claims.

I claim:

1. In a meter having a dial, a pivoted pointer adapted to sweep said dial to indicate measurements, a plurality of means for producing beams of light each beam being of a different color, means for concentrating said beams in a predetermined paths only adjacent said dial, and a mirror for said pointer for interrupting and reflecting said beams as said pointer passes through said beams while sweeping said dial.

2. In a meter having a dial, a pivoted pointer adapted to sweep said dial to indicate measurements, a plurality of lamps for producing beams of light of different colors, means for concentrating said beams in paths adjacent said dial, and a convex mirror mounted adjacent an end of said pointer for interrupting and reflecting said colored beams outwardly from said dial face as said pointer passes the same.

3. In a meter having a dial, a pivoted pointer adapted to sweep said dial to indicate measurements, means for producing two beams of colored light, means for concentrating each of the colored beams in a different predetermined path adjacent said dial, and a pointer having a convex mirror thereon for interrupting and reflecting said beams in an outward direction with respect to said dial as said pointer passes through said paths while sweeping said dial.

4. In a meter having a dial, a pivoted pointer adapted to sweep said dial to indicate measurements, means for producing a beam of light, means for concentrating said beam of light in a predetermined path substantially parallel to and adjacent said dial and substantially radial with respect thereto said pointer having an angularly disposed tip arranged to pass through the concentrated beam of light as the pointer sweeps said dial said tip being provided with a convex mirror for reflecting said beam of light outwardly from said dial.

HARRY KENOSIAN.

REFERENCES CITED

The following references are of record in the file of this patent:

UNITED STATES PATENTS

| Number | Name | Date |
| --- | --- | --- |
| 1,558,895 | Kreisel | Oct. 27, 1925 |
| 1,800,210 | Condliffe | Apr. 14, 1931 |
| 1,894,111 | Marcellus | Jan. 10, 1933 |
| 2,165,498 | Moody | July 11, 1939 |
| 2,248,325 | Bacon | July 8, 1941 |
| 2,329,715 | Grier | Sept. 21, 1943 |
| 2,383,321 | Kleber | Aug. 21, 1945 |
| 2,428,792 | Evans | Oct. 14, 1947 |
| 2,437,679 | Burgers | Mar. 16, 1948 |